United States Patent [19]
Varacalle, Jr. et al.

[11] Patent Number: 5,332,601
[45] Date of Patent: Jul. 26, 1994

[54] METHOD OF FABRICATING SILICON CARBIDE COATINGS ON GRAPHITE SURFACES

[75] Inventors: Dominic J. Varacalle, Jr., Idaho Falls, Id.; Herbert Herman, Port Jefferson, N.Y.; Timothy D. Burchell, Oak Ridge, Tenn.

[73] Assignee: The United States as represented by the United States Department of Energy, Washington, D.C.

[21] Appl. No.: 988,598

[22] Filed: Dec. 10, 1992

[51] Int. Cl.$^5$ .............................................. C23C 4/00
[52] U.S. Cl. ................................. 427/452; 427/3977; 427/399
[58] Field of Search ...................... 427/452, 397.7, 399

[56] References Cited

U.S. PATENT DOCUMENTS

| | | | |
|---|---|---|---|
| 3,814,620 | 10/1971 | Bailey et al. | 427/452 |
| 3,925,577 | 12/1975 | Fatzer et al. | 427/399 |
| 4,513,030 | 4/1985 | Milewski | 427/452 |
| 4,689,212 | 8/1987 | Mansfield | 427/452 |
| 4,716,572 | 12/1987 | Kuhn et al. | 427/452 |
| 4,722,762 | 2/1988 | Luhleich et al. | 427/399 |
| 4,900,531 | 2/1990 | Levin | 427/399 |

OTHER PUBLICATIONS

Herbert Herman, "Coatings and Coating Practices", Advanced Materials & Processes, vol. 137, Issue 1, Jan. 1990.
Herbert Herman, "Plasma-sprayed Coatings", Scientific American, Sep. 1988, pp. 112-117.
D. J. Varacalle, Jr. et al., "Vacuum-plasma-sprayed silicon coatings", Surface and Coatings Technology, 49 (1991), pp. 24-30.
D. J. Varacalle, Jr. et al., "Coatings Applied with the Plasma-Spray Process Using Nickel-Aluminum Powders", ICLASS-91, Proceedings of the Fifth International Conf. on Liquid Atomization and Spray Systems, Jul. 14-18, 1991, pp. 113-120.

Primary Examiner—Shrive Beck
Assistant Examiner—Brian K. Talbot
Attorney, Agent, or Firm—Robert J. Fisher; Hugh W. Glenn; William R. Moser

[57] ABSTRACT

The vacuum plasma spray process produces well-bonded, dense, stress-free coatings for a variety of materials on a wide range of substrates. The process is used in many industries to provide for the excellent wear, corrosion resistance, and high temperature behavior of the fabricated coatings. In this application, silicon metal is deposited on graphite. This invention discloses the optimum processing parameters for as-sprayed coating qualities. The method also discloses the effect of thermal cycling on silicon samples in an inert helium atmosphere at about 1600°C. which transforms the coating to silicon carbide.

8 Claims, 3 Drawing Sheets

METHOD OF FABRICATING SILICON CARBIDE COATINGS ON GRAPHITE SURFACES

CONTRACTUAL ORIGIN OF THE INVENTION

The U.S. Government has rights in this invention pursuant to Contract No. DE-AC07-76ID01570 between the U.S. Department of Energy and EG&G Idaho, Inc.

FIELD OF THE INVENTION

This invention relates to a vacuum plasma spray process that is utilized to deposit dense silicon metal coatings on graphite components. The resulting coated samples are then heat-treated in an inert atmosphere (i.e., helium) at high temperature (e.g., 1600° C.) allowing a preferential conversion of the silicon metal to silicon carbide (SIC).

BACKGROUND OF THE INVENTION

Silicon carbide (SIC) is a refractory carbide that decomposes at approximately 2400° C. The material has several crystallographic forms (polytypes) which are stable with an appreciable deficiency of carbon (sub-stoichiometric) and may also contain excess carbon. Often, the SiC properties, e.g., the electrical conductivity, is determined by the carbon content. The hexagonal alpha ($\alpha$) and cubic beta ($\beta$) crystallographic structures are the most common. SiC is a fair electrical conductor, has very good thermal conductivity, and has excellent physical stability. The material is insoluble in acids; however, it may be dissolved in molten potassium hydroxide (KOH), SiC is oxidation resistant by virtue of its forming a surface layer of $SiO_2$ in a high temperature oxidizing environment.

SiC is used as a hard and wear resistant coating material and as a high temperature semiconductor material. SiC coatings are used on graphite heaters to prevent sublimation of the graphite and as a protective coating on graphite at high temperatures in oxidizing atmospheres. Since starting materials, i.e., powders, can be obtained in very pure form and fabricated in an impurity-free environment, SiC structures are used in applications such as furnace liners and high temperature fixturing to avoid contaminating semiconductor device materials.

Chemical vapor deposition (CVD) is one method of preparing both cubic and hexagonal SiC coatings if the substrate can withstand the high temperatures necessary to obtain dense, high quality SiC material and the SiC-substrate thermal coefficient of expansion mismatch is not such that excessive stresses develop which cause loss of adhesion. When diffusion occurs across an interface, voids may form at the interface (Kirkendall porosity) which may result in poor adhesion.

The chemical vapor deposition technique is rather limited in the size of the parts that can be coated since they need to be contained in a high temperature furnace. For large or numerous parts, a "hot-wall" CVD reactor is used. Complex geometrical shapes can be coated since the deposition is not "line-of-sight". However, flow variations over the surface can give varying coating thickness and material properties. Generally, CVD is a relatively expensive coating process since the deposition rate is slow.

A preferred method of silicon powder deposition is, therefore, the vacuum plasma spray (VPS) method, since the VPS process alleviates ambient thermochemistry effects by controlled spraying in a reduced-pressure inert gas. Vacuum plasma spraying is a versatile and rapid method of applying high purity, high performance protective coatings. Typically, VPS involves plasma spraying at 20–100 mbar.

SUMMARY OF THE INVENTION

Generally stated, the invention consists of a method of forming a silicon carbide coating on a graphite substrate comprising:

vacuum plasma spraying the graphite substrate with a silicon powder within a vacuum plasma spray chamber thereby forming a silicon coating on the substrate;

removing the sprayed graphite substrate from the vacuum chamber;

heating the sprayed graphite substrate in an inert gas atmosphere oven at 1600° C.; and then cooling the oven to ambient temperature wherein the 1600° C. temperature causes a preferential conversion of the silicon coating on the substrate to the silicon carbide coating.

Other objects, advantages, and capabilities of the present invention will become more apparent as the description proceeds.

BRIEF DESCRIPTION OF THE DRAWINGS

The invention may be better understood and further advantages and uses thereof may become more readily apparent when considered in view of the following detailed description of the exemplary embodiments, taken with the accompanied drawings, in which.

DETAILED DESCRIPTION OF THE INVENTION

Figure 1:
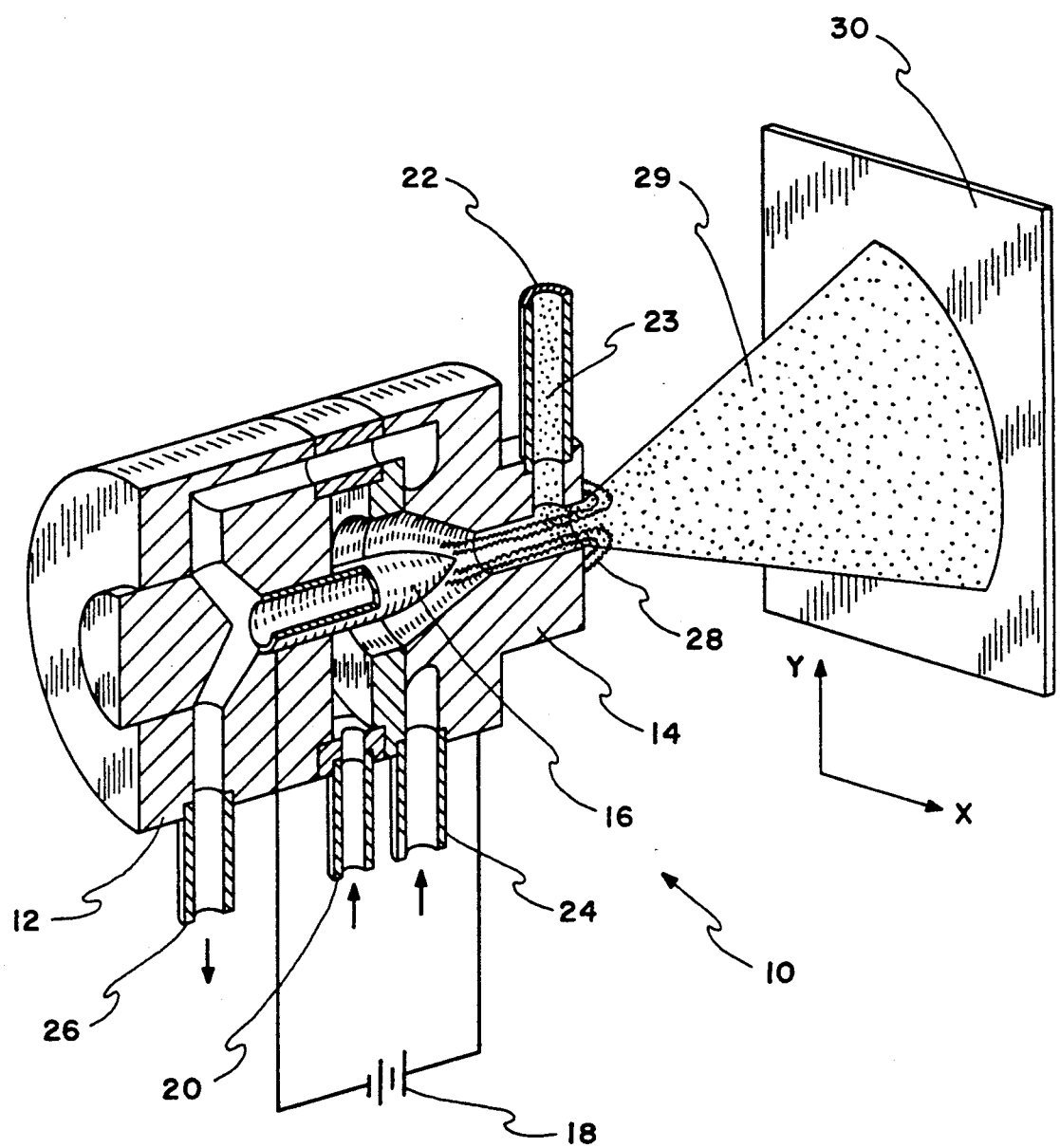
FIG. 1 is a partial perspective section view of a plasma spray gun spraying a substrate, as used in the inventive method.

The method of forming a silicon carbide (SIC) coating will be described by referring to the plasma gun 10 illustrated in FIG. 1. The gun 10 for the vacuum plasma spray system is mounted within an evacuated vacuum plasma spray chamber about 4 feet diameter and 6 feet long (not shown) and generally consists of a body 12 having a cylindrical anode 14 and a conical cathode 16 centered within the anode. Electric current is supplied to these electrodes from a power source 18. An inert gas, usually argon with an admixture of hydrogen, enters at tube 20 and flows through the space between the electrodes, where it is ionized to form a plasma. A second tube 22 directs powdered coating material 23 into the jet of plasma that develops in the nozzle. Water circulates through passages in the gun for cooling purposes, entering at 24, and exiting at 26.

The gun 10 begins operating when a pulse of current creates an electric arc 28 (an electrically conducting channel in a gas) across the gap between the electrodes. A steady direct current of many hundreds of amperes, i.e., typically 600 amperes, at a potential of 50 volts or so then sustains the arc. As the arc forms, electrons are torn from the atoms of the gas. In this way, the gas within the arc is transformed into a collection of neutral atoms, ions, and energetic electrons, i.e., a plasma environment. The stream of gas that flows between the electrodes then passes out of the nozzle of the gun as a plasma flame.

As the powder is injected into the plasma flame 29, the silicon particles melt as they are sprayed onto the substrate 30 where the particles flatten and then cool, adhering to the surface of the substrate 30, in this case, graphite.

lightly grit blasted with silicon carbide grit before spraying.

TABLE 1

Silicon Thermal Spraying Experiments

| | Variables | | | Results | | | | |
|---|---|---|---|---|---|---|---|---|
| | Current | Primary Gas Flow | Secondary Gas Flow | Power | Si Thickness[a] | | Porosity[b] | Porosity[c] | Hardness[d] |
| Sample | (Amps) | (1 min$^{-1}$) | (1 min$^{-1}$) | (kW) | in. | μm | (%) | (%) | (HV) |
| Si1 | 600 | 50 | 8.5 | 38.4 | $10 \times 10^3$ | 254 | 1.10 | 0.57 | 968 |
| Si2 | 600 | 60 | 10.0 | 40.2 | $9.6 \times 10^3$ | 244 | 0.92 | 0.58 | 929 |
| Si3 | 700 | 50 | 10.0 | 47.6 | $11 \times 10^{-3}$ | 278 | 0.35 | 0.39 | 902 |
| Si4 | 700 | 60 | 8.5 | 48.3 | $8 \times 10^{-3}$ | 206 | 0.65 | 0.68 | 940 |

[a]Thickness based on an average of 12 readings.
[b]Porosity based on an average of six readings (optical microscopy)
[c]Porosity based on an average of six readings (SEM)
[d]Microhardness based on an average of six readings (25 gf load).

EXPERIMENTAL PROCEDURES

A Taguchi-style fractional-factorial L4 experiment design was employed to evaluate the effect of three plasma processing variables on the quantitatively measured responses. Prior testing had optimized the system parameters to allow an L4 design of experiments. The parameters varied were amperage, primary gas flow, and secondary gas flow. These gases are mixed in a separate reservoir (not shown) prior to entering gun 10 at gas tube 20. The resulting as-sprayed coatings were evaluated for thickness, microhardness, porosity, and phase structure.

Experiments Si1-Si4 in Table 1 represent the four runs evaluated with the Taguchi L4 approach. Each variable has two levels selected to band around chosen nominal settings. The Taguchi evaluation statistically delineates the impact of each factor on the measured coating characteristics across all combinations of other factors. The Taguchi analysis was accomplished with PC-based software on the measured responses.

An A2000 Plasma-Technik AG Switzerland VPS system was utilized for this experiment. The VPS chamber is cylindrical, 1.2 m in diameter by 1.8 m long. The F4-V vacuum plasma gun is rated at 55 kW, which is designed to operated in a vacuum between 20 and 200 mbar. A PT-A2000 console controls all process parameters to the plasma gun.

The VPS experimental testing data is shown in Table 1. The primary gas was argon, and the secondary gas was hydrogen. The powder carrier was argon, typically at 4 liters (l) per min. (console flow). Powder was injected internal to the gun and directed perpendicular to the gas flow. An x-y manipulator was used to ensure the stand-off distance and repeatability in the experiments. The x direction traverse rate was 75 mm sec$^{-1}$ with a y direction step up or down of 5 mm. The chamber pressure was 60 mbar. The spray distance was 300 mm. Four passes were used to fabricate each of the coatings.

A commercially available silicon metal powder with a nominal size of 20 μm was used for this study. The powder sieve analysis is shown in Table 2. The powder was vacuum plasma sprayed onto graphite coupons (51 mm × 51 mm × 13 mm). One side of each coupon was

TABLE 2

Silicon Powder Sieve Analysis

| Sieve (μm) | Amount (%) |
|---|---|
| >45 | 0.0 |
| 25-45 | 3.7 |
| 20-25 | 39.2 |
| 15-20 | 57.0 |
| <15 | 0.1 |

The coating qualities of the as-sprayed coatings were evaluated with optical microscopy, scanning electron microscopy (SEM), energy-dispersive (X-ray) spectroscopy (EDS), Vickers Hardness (HV) test, and X-ray diffraction (XRD).

Coating thicknesses, as revealed by optical metallographic observations at 200× magnification, are listed in Table 1. Average thicknesses from 12 measurements of the silicon coating are listed. The silicon deposits, reflecting the influences of the spraying parameters, ranged from 206 to 278 μm.

Figure 2:
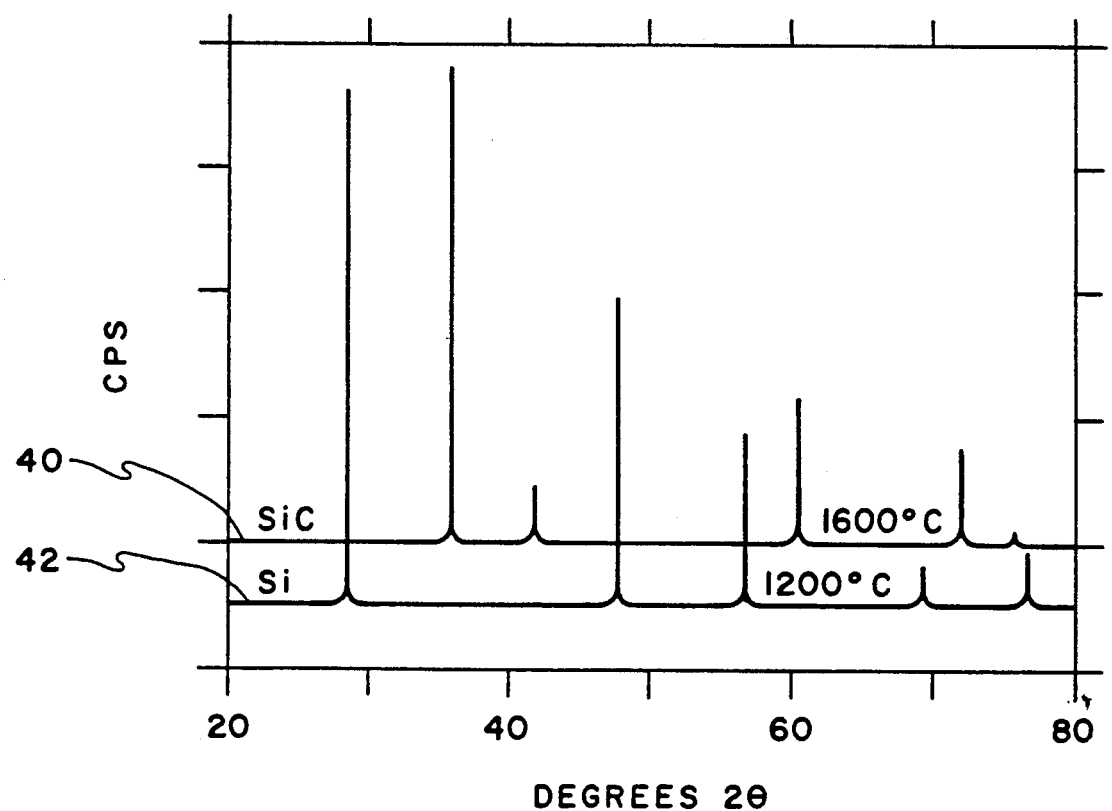
FIG. 2 is a surface micrograph of the as-sprayed coating (magnification 500×)

Variances in the porosity were examined with optical microscopy and SEM. The porosity of the silicon coatings ranged from 0.35 to 1.1% (optical microscopy) and from 0.39 to 0.68% (SEM). Coating Si3 reflected the lowest porosity of all four coatings. No cracking was apparent in the body of any of the coatings within the text matrix, suggesting a molten phase deposition. Examinations with SEM revealed finer microstructural features of the coating cross-section. Porosity as small as 1 μm and no microcracking were evident at a magnification of 1000×. Surface examinations with SEM revealed splat-like formations, indicating the predominance of molten conditions upon deposition (FIG. 2). Sample Si3 appears to be the smoothest of all the as-sprayed samples.

The microhardness was measured on the coatings normal to the microstructure using a Vickers test. Six measurements were taken and averaged. The average hardness of the coatings ranged from 902 to 968 HV, as listed in Table 1.

The phases in the coatings were qualitatively assessed with XRD measurements. The measurements were taken on the feedstock powder and the coatings normal to the deposit. All the as-sprayed VPS coatings exhibited XRD spectra that closely matched the XRD spectra of the silicon feedstock material. Graphite and silicon were the most intense of all the patterns matched. No evidence of SiO$_2$ or SiC phases was detected. Thus, the as-sprayed coatings showed no decomposition of the original feedstock material.

Analysis by EDS and X-ray mapping indicated that the body of the as-sprayed coatings were predominantly silicon with some carbon. The carbon may indicate that some silicon carbide formed as the coating was sprayed or that carbon was entrained in the gas plume as the coating was sprayed. At the coating-substrate interface, both silicon and carbon were strongly detected, indicating possible silicon carbide formation.

The Taguchi evaluation was designed to minimize the porosity in the as-sprayed coatings, while other coating attributes were of secondary concern. Confirmation analysis was conducted to place confidence limits on projected results for a given set of design factors. Selecting the optimum levels of the process parameters can produce the optimum coating. This coating would have low porosity and high hardness and be relatively thick. This coating could be obtained by using a primary flow of 50 liters min$^{-1}$, a secondary flow of 10 liters min$^{-1}$, and a power level of 600 amps. Extrapolation of the Taguchi results to the 95% confidence level yields a coating with a porosity of 0.45%, a microhardness of 925 HV, and a thickness of $11.8 \times 10^{-3}$ in (300 μm). Sample Si3 provided the closest experimental sample to this optimum design and was the most dense deposit in the study.

COATING THERMAL CYCLING EXPERIMENTS

To assess the performance (i.e., adherence and transformation) of the plasma-sprayed silicon coatings during thermal cycling, six graphite samples (coated on one side) were loaded in a high temperature resistance furnace and subjected to a cumulative thermal cycling treatment that ranged from 1 to 15 cycles to temperatures of 1200° C. for 14 cycles with a one liter min$^{-1}$ flow of helium gas at 400° C. for 5 hours. The heating and cooling rates were approximately 10° C. min$^{-1}$. The fifteenth thermal cycle was held at 1600° C.

Samples were weighed before and after thermal cycling. After thermal cycling, all samples were viewed under a stereoscopic microscope for evidence of cracking. For each sample, XRD spectra were determined for the as-received plasma-sprayed coating and the heat-tested coating to determine whether any reaction had occurred between the silicon and the graphite substrate.

All samples showed a small measurable weight loss, ranging from 0.015% after a single high temperature cycle to 0.28% after 15 high temperature cycles. The weight loss is attributed to oxidation of the uncoated graphite surfaces by trace quantities of oxygen and water vapor in the helium gas stream.

Stereoscopic observations indicated no cracking or other degradation in the silicon coating during the first 14 thermal cycles. The final thermal cycle at 1600° C. exceeded the melting point of silicon (1412° C.). Visual observations indicated that the silicon had melted and infiltrated the graphite substrate.

Figure 3:
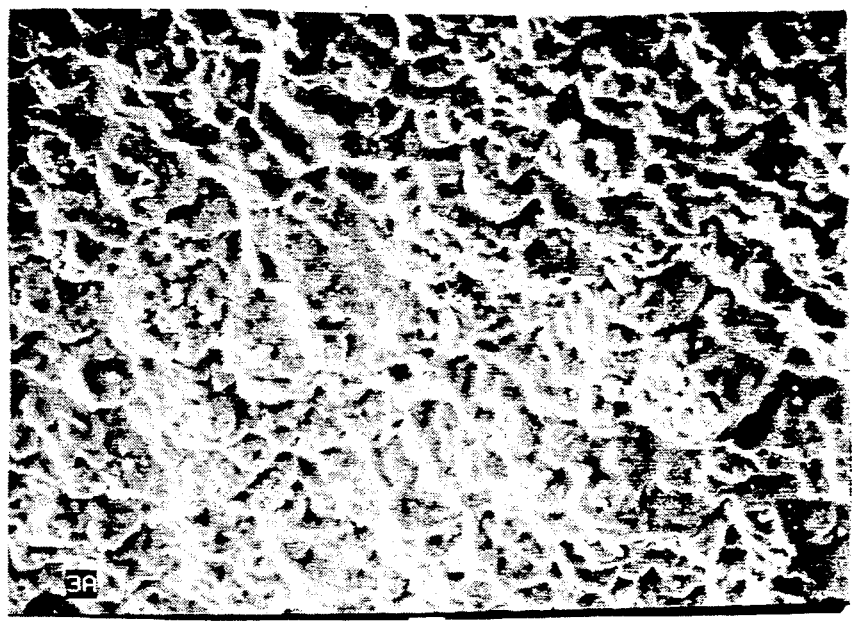
FIG. 3 is an X-ray diffraction spectrum of sprayed sample after heat treatment.

An XRD spectrum was determined for the plasma-sprayed surface of all samples as shown in FIG. 3. The XRD spectra for the as-sprayed samples and the first five samples removed from the furnace indicated that the plasma sprayed silicon remained structurally unaltered. However, the spectrum for silicon sample 15, which experienced the 1600° C. temperature cycle, indicated that more than 99% of the coating transformed to β-SiC, as indicated by the spectra shown in FIG. 3. The spectra for silicon carbide is shown at line 40 where the sample 15 had been heated to 1600° C. The spectra at line 42 is an as-sprayed silicon sample thermally cycled to only 1200° C. and the silicon has remained intact and unconverted to SiC.

COATING-GRAPHITE OXIDATION EXPERIMENT

An experiment was conducted to investigate whether the as-sprayed VPS silicon coatings could protect graphite from oxidation, thus indicating if the coatings were fully dense, i.e., no through porosity. Five samples (four graphite samples completely encapsulated in silicon metal (Si1, Si2, Si3, and Si4) and one graphite sample) were loaded into a high temperature tube furnace of 2 inches inside diameter and subjected to a thermal excursion while under a flow of air. The samples were weighted before and after the test. The heating and cooling rates were approximately 12° C. min$^{-1}$. The samples were heated from ambient temperature to 900° C. in a helium environment (flow rate approximately 25,000 cm$^3$ min$^{-1}$ (50 standard ft$^3$ h$^{-1}$)). The helium flow was turned off and air was introduced at a flow rate of 1000 cm$^3$ min$^{-1}$ (2.1 standard ft$^3$ h$^{-1}$). The samples were held at this condition for 2 hours. At this point, the air flow was turned off and the samples were cooled to ambient conditions and then weighed.

The results of this experiment are shown in Table 3. The graphite sample lost two-thirds of its weight during the experiment, while the four coated samples retained their pre-test weights. Visual observations indicated no cracking or other degradation in the silicon coatings as a result of this experiment.

TABLE 3

| | Graphite Oxidation Test Results | |
|---|---|---|
| Sample | Pre-Test Weigh (gr) | Post-Test Weight (gr) |
| Graphite | 5.75 | 2.19 |
| Si1 | 6.46 | 6.46 |
| Si2 | 6.52 | 6.54 |
| Si3 | 6.60 | 6.61 |
| Si4 | 6.05 | 6.06 |

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

What is claimed is:

1. A method of forming a silicon carbide coating on a graphite substrate comprising the steps of:
   a. vacuum plasma spraying the graphite substrate with a silicon powder within a vacuum plasma spray chamber thereby forming a silicon coating on the substrate, further comprising:
      i. evacuating a plasma spray gun within the vacuum chamber to a pressure of between 20 and 200 mbar;
      ii. mixing and injecting a gas mixture of about 85% argon and 15% hydrogen within the plasma spray gun;
      iii. generating an electric arc within the plasma spray gun;
      iv. passing the mixture through the electric arc, thereby creating a plasma environment; and then
   b. removing the as-sprayed graphite substrate from the vacuum chamber;

c. heating the as-sprayed graphite substrate and silicon coating in an inert gas atmosphere oven to 1600° C.; and then d. cooling the oven to ambient temperatures, wherein the 1600° C. temperature causes a conversion of the silicon coating on the substrate to the silicon carbide coating, said silicon carbide coating having a porosity in the range of 0.35 to 1.1%, a Vickers hardness in the range of 902 to 968 HV, and a thickness of over 200 $\mu$m.

2. The method as recited in claim 1 wherein a current flow in the gun to create the electric arc is between 600 and 700 amps.

3. The method as recited in claim 1 wherein the powder carrier gas flow is about 4 liters/minute.

4. The method as recited in claim 3 wherein a silicon powder sieve size is less than 45 $\mu$m.

5. The method as recited in claim 4 wherein an as-sprayed silicon coating has a porosity of less than 0.68%.

6. The method as recited in claim 1 wherein an oven heating and cooling rate is about 10° C./minute and the inert gas used is helium.

7. A method of forming a silicon carbide coating on a graphite substrate comprising the steps of:

a. vacuum plasma spraying the graphite substrate with a silicon powder within a vacuum plasma spray chamber having a vacuum of between 20 and 200 mbar and having an argon primary gas flow of about 50 liters/minute and a hydrogen secondary gas flow of about 10 liters/minute, thereby forming a silicon coating on the substrate;

b. removing the sprayed graphite substrate from the vacuum chamber;

c. heating the sprayed graphite substrate and silicon coating in an inert gas atmosphere oven to 1600° C.; and then d. cooling the oven to ambient temperatures, wherein the 1600° C. temperature causes a conversion of the silicon coating on the substrate to the nonporous silicon carbide coating, said silicon carbide coating having a porosity in the range of 0.35 to 1.1%, a Vickers hardness in the range of 902 to 968 HV, and a thickness of over 200 $\mu$m.

8. The method as recited in claim 7 wherein the vacuum plasma spraying is performed using a plasma gun having a current of about 600 amps.

* * * * *